United States Patent
Paul et al.

(10) Patent No.: US 12,000,956 B2
(45) Date of Patent: Jun. 4, 2024

(54) METHOD FOR OPERATING A TESTING DEVICE FOR TESTING A DISTANCE SENSOR OPERATING WITH ELECTROMAGNETIC WAVES, AND CORRESPONDING TESTING DEVICE

(71) Applicant: dSPACE GmbH, Paderborn, DE (US)

(72) Inventors: Jeffrey Paul, Torrance, CA (US); Ronald Bergen, Newport Beach, CA (US)

( * ) Notice: Subject to any disclaimer, the term of this patent is extended or adjusted under 35 U.S.C. 154(b) by 321 days.

(21) Appl. No.: 17/419,914

(22) PCT Filed: Dec. 28, 2019

(86) PCT No.: PCT/EP2019/087125
§ 371 (c)(1),
(2) Date: Jun. 30, 2021

(87) PCT Pub. No.: WO2020/141151
PCT Pub. Date: Jul. 9, 2020

(65) Prior Publication Data
US 2022/0082658 A1     Mar. 17, 2022

Related U.S. Application Data

(60) Provisional application No. 62/786,767, filed on Dec. 31, 2018.

(51) Int. Cl.
*G01S 7/40* (2006.01)
*G01S 7/497* (2006.01)
*G01S 13/931* (2020.01)

(52) U.S. Cl.
CPC .............. *G01S 7/4056* (2013.01); *G01S 7/40* (2013.01); *G01S 7/4086* (2021.05);
(Continued)

(58) Field of Classification Search
CPC .... G01S 13/343; G01S 13/931; G01S 17/931; G01S 2013/9323; G01S 7/40;
(Continued)

(56) References Cited

U.S. PATENT DOCUMENTS

| | | |
|---|---|---|
| 4,450,447 A | 5/1984 | Zebker et al. |
| 5,920,281 A | 7/1999 | Grace |
| 2004/0012517 A1 | 1/2004 | Abou-Jaoude et al. |

FOREIGN PATENT DOCUMENTS

KR      101041990 B1      6/2011

OTHER PUBLICATIONS

Abou-Jaoude, Ramzi, et al.; "Low Cost 76GHz Radar Target Simulator and Test System"; 2000 30th European Microwave Conference, [Proceedings of the European Microwave Conference, London, CMP, GB, vol. Conf. 30]; Paris, France; Oct. 4, 2020; 361-364 Pages.

(Continued)

*Primary Examiner* — Timothy X Pham
(74) *Attorney, Agent, or Firm* — Patrick D. Duplessis (57) ABSTRACT

A method for testing a distance sensor includes: receiving an electromagnetic free-space wave as a receive signal; generating a simulated electromagnetic reflection signal therefrom; shifting a reflection frequency of the reflection signal by a Doppler frequency smaller than a signal bandwidth of the receive signal; converting the receive signal into a first work signal having a first work frequency smaller than a receive frequency of the receive signal; converting the first work signal into a second work signal having a second work frequency, wherein the difference between the first and second work frequencies is at least as large as the signal bandwidth plus the Doppler frequency; converting the second work signal into a third work signal having a third work frequency that corresponds to the first work frequency shifted by the Doppler frequency; increasing the third work (Continued)

signal by the conversion frequency; and radiating the third work signal.

29 Claims, 4 Drawing Sheets

(52) U.S. Cl.
CPC ............ *G01S 7/4095* (2021.05); *G01S 7/497* (2013.01); *G01S 13/931* (2013.01); *G01S 2013/9323* (2020.01)

(58) Field of Classification Search
CPC .... G01S 7/4052; G01S 7/4056; G01S 7/4086; G01S 7/4095; G01S 7/497
See application file for complete search history.

(56) References Cited

OTHER PUBLICATIONS

Rozmann, Michael; "Echte Echos im Labor, Radartestplatz (Real Echoes in the Laboratory, Radar Test Station); Testing radar sensors with real radar echoes Real Echoes in the Lab"; dSPACE Magazine Feb. 2017; dSPACE GmbH, Paderborn, Germany; www.dspace.com; Feb. 2017; 4 Pages.

International Search Report and Written Opinion of the International Searching Authority; Application No. PCT/EP2019/087125; Completed: Mar. 30, 2020; dated Apr. 8, 2020; 14 Pages.

METHOD FOR OPERATING A TESTING DEVICE FOR TESTING A DISTANCE SENSOR OPERATING WITH ELECTROMAGNETIC WAVES, AND CORRESPONDING TESTING DEVICE

TECHNICAL FIELD

The invention relates to a method for operating a testing device for testing a distance sensor operating with electromagnetic waves, namely for generating and radiating a simulated electromagnetic reflection signal $S_{TX}$ having a reflection frequency $f_{TX}$, wherein an electromagnetic free-space wave is received as a receive signal $S_{RX}$ having a receive frequency $f_{RX}$ and a signal bandwidth B and wherein the reflection signal $S_{TX}$ is generated from the received electromagnetic signal $S_{RX}$, wherein the reflection frequency $f_{TX}$ is shifted by a Doppler frequency $f_D$ relative to the receive frequency $f_{RX}$, wherein the Doppler frequency $f_D$ is smaller than the signal bandwidth B of the receive signal $S_{RX}$. Furthermore, the invention also relates to a corresponding testing device, i.e., a testing device for testing a distance sensor operating with electromagnetic waves for carrying out the above method having a receiving element for receiving an electromagnetic free-space wave as a receive signal $S_{RX}$ having a receive frequency $f_{RX}$ and a signal bandwidth B, having a radiating element for radiating a simulated electromagnetic reflection signal $S_{TX}$ having a reflection frequency $f_{TX}$, wherein signal electronics generate the reflection signal $S_{TX}$ from the electromagnetic receive signal $S_{RX}$, wherein the signal electronics generate the reflection signal $S_{TX}$ having a reflection frequency $f_{TX}$ shifted by a Doppler frequency $f_D$ to be simulated with respect to the receive frequency $f_{RX}$ of the receive signal $S_{RX}$, wherein the Doppler frequency $f_D$ is smaller than the signal bandwidth B of the receive signal $S_{RX}$.

BACKGROUND

The aforementioned method for operating a testing device and corresponding testing devices for testing distance sensors have been known for some time in the field of control unit development and control unit testing—for example in the automotive sector. A frequent test scenario here is to test the functionality of a production control unit using a simulated environment. For this, the environment of the control unit is calculated in part or completely in real time using a powerful simulation environment, wherein the simulation environment generates physical signals that are input signals of the control unit and wherein the simulation environment records the output signals generated by the control unit and incorporates them into the real-time simulation. This allows control units to be tested safely in a simulated environment under virtually "real" conditions. How realistic the test is depends on the quality of the simulation environment and the simulation calculated using it. Control units can thus be tested in a closed loop, which is why such test scenarios are also referred to as hardware-in-the-loop tests.

The present case deals with the testing of distance sensors that work with electromagnetic waves. In the automotive sector, radar sensors are predominantly used. In principle, however, distance sensors can also be tested that operate in a different frequency range of electromagnetic waves, for example in the visible light range, or that operate with electromagnetic radiation sources that emit electromagnetic waves with a long coherence length, such as in laser applications (e.g., lidar).

Distance sensors are increasingly being used in modern vehicles to provide the vehicle and its assistance systems with environment information. For example, the position and speed of objects in the vehicle environment are determined. Assistance systems that use such environment information include adaptive cruise control (ACC) and autonomous emergency breaking (AEB). It is understandable that the testing of such safety-relevant assistance systems must be carried out with great care, wherein the propagation behavior of the electromagnetic waves must also be taken into account as realistically as possible. In the past, this was mainly done by very costly and time-consuming real driving tests. These driving tests are increasingly being replaced by the testing devices described above for testing a distance sensor, also known as test benches, in which free space waves are also used. Such test benches are also called OTA test benches (over-the-air), in which the distance sensor to be tested actually radiates electromagnetic waves into the free space, i.e., unguided, and also receives electromagnetic waves from the free space as a simulated reflection signal. The advantage of such OTA test benches is the extensive testing of the entire effect chain in connection with the distance sensor to be tested, including the radiation and reception behavior in which the sensor radiating element and the sensor receiving element are involved.

Regardless of which type of electromagnetic wave the distance sensor to be tested uses, the testing of distance sensors places extremely high demands on the required electronic signal processing. Distances of an object in the environment are usually determined directly by the signal propagation time, which reflects the emitted electromagnetic waves to the object and from the object back to the distance sensor. Radial velocity components of objects in the environment are determined by frequency shifts between the radiated electromagnetic wave and the reflected electromagnetic wave (Doppler shift).

Due to the electromagnetic waves propagating at the speed of light, very short signal propagation times must be resolved here. For example, in order to detect a minimum distance of one meter, signal propagation times in the nanosecond range must be resolved. If larger distances are to be measured in the range of centimeters, i.e., independent of the question of minimum distance, it must also be possible to resolve differences in propagation time in the sub-nanosecond range.

The present invention deals with the simulation of a moving object that moves away from a distance sensor to be tested or moves towards the distance sensor to be tested at a certain radial velocity. These radial motion components are determined by recording the frequency shift of the reflected reflection signal relative to the frequency of the transmitted signal radiated by the distance sensor to be tested; this frequency shift is the Doppler frequency $f_D$ already mentioned at the beginning.

The electromagnetic waves radiated by the distance sensor to be tested are not actually to be reflected in the test bench or in the test device; rather, the radiated electromagnetic waves are received by a receiving element of the test device and processed in downstream, fast signal electronics—a distance and movement simulator—delayed in running time and frequency modulated. Depending on the distance to be simulated to a simulated environment object or depending on the radial relative velocity of the environment object to the distance sensor to be tested, signals delayed in time and/or frequency shifted by the Doppler frequency are generated by the signal electronics and emitted as a simulated—i.e., not actual—reflection signal via the radiating element of the testing device again in the direction of the distance sensor to be tested. The distance sensor thus creates the impression of a real environment with, if necessary, several objects at different distances and moving at different speeds in the simulated environment.

Testing devices known from the prior art ("Echte Echos im Labor": dSPACE Magazine 2/2017, December 2017) are characterized by a mechanical test bench structure that will not be discussed here, and by signal electronics for generating a simulated reflection signal, which is what is at issue here, especially the frequency shift of the receive signal by the Doppler frequency $f_D$. A particular challenge here is that signals with very different frequencies have to be processed together, frequencies that can differ by many orders of magnitude. This is illustrated by a practical example. If, for example, the transmitted signal of the distance sensor to be tested has a (center) frequency of 77 GHz and an object moves radially to the distance sensor at 100 m/s (which corresponds to 360 km/h, a practically already unrealistically high speed in the automotive sector), then the Doppler frequency $f_D$, i.e., the frequency difference between radiated and received signal, at the distance sensor to be tested is only about 51.55 kHz (first approximation is non-relativistic for small object velocities v compared to the speed of light c and for radiated radar signals with the frequency $f_R$: $f_D=2*v/c*f_R$, the factor "2" because of the double effect at the point of radiation of the radar radiation, i.e., after reflection). The difference between the frequencies is therefore only in the range of thousandths per mille, with correspondingly high demands on the accuracy of the signal electronics, which for the aforementioned reason is often complex and expensive to implement. If the radar signal itself has a bandwidth of 1 GHz, then the conditions are not much less critical with respect to this value.

SUMMARY

The object of the present invention is, thus, to design and further develop the method described above for operating a testing device for testing a distance sensor operating with electromagnetic waves and a related testing device in such a manner that it is relatively easy to generate, from a receive signal, a desired reflection signal which is frequency-modulated by a relatively small Doppler frequency relative to the received signal.

The previously derived and described object is achieved according to the invention in the above-mentioned method for operating a testing device for testing a distance sensor operating with electromagnetic waves in that the receive signal $S_{RX}$, which the testing device obtains directly from the distance sensor to be tested as a free-space signal, is converted into a first work signal $S_1$ having a first work frequency $f_1$, wherein the work frequency $f_1$ is smaller, by a conversion frequency $f_U$, than the receive frequency $f_{RX}$ of the receive signal $S_{RX}$. This means that the signal electronics can operate internally at a considerably lower frequency than the frequency of the receive signal $S_{RX}$. It makes sense to implement a large frequency jump $f_U$ here. If, for example, the receive signal $S_{RX}$ has a frequency $f_{RX}$ of 77 GHz, then the conversion should ideally take place in the range below 10 GHz.

In addition, the first work signal $S_1$ is converted into a second work signal $S_2$ having a second work frequency $f_2$ (thus, the second work signal $S_2$ exhibits the second work frequency $f_2$), wherein the absolute value of the difference between the first work frequency $f_1$ and the second work frequency $f_2$ is at least as large as the signal bandwidth B, preferably at least as large as the sum of the signal bandwidth B and the Doppler frequency $f_D$. The importance of this measure only becomes clear in connection with the subsequent process step. Here it is provided that the second work signal $S_2$ is converted into a third work signal $S_3$ having a third work frequency $f_3$, the third work signal $S_3$ thus exhibits this third work frequency $f_3$. The third work frequency $f_3$ corresponds to the first work frequency $f_1$ shifted by the Doppler frequency $f_D$.

Finally, this third work signal $S_3$ is increased by the conversion frequency $f_U$ and thus converted into the reflection signal $S_{TX}$ and radiated. The conversion frequency $f_U$ is the same conversion frequency $f_U$ with which the receive signal $S_{RX}$ was frequency-reduced into a first work signal $S_1$ in the introduction. The reduction of the receive signal $S_{RX}$ into the first work signal $S_1$ having the conversion frequency $f_U$ and the increase of the third work signal having the same conversion frequency $f_U$, on the one hand, opens up interesting possibilities in terms of circuitry for the implementation of the method presented here. On the other hand, boundary conditions are thereby defined, which influence the conversion of the first work signal $S_1$ into the second work signal $S_2$ and the conversion of the second work signal $S_2$ into the third work signal $S_3$.

It was mentioned in the introduction that the receive signal $S_{RX}$ has a receive frequency $f_{RX}$ and a signal bandwidth B. This means that the frequency spectrum of the signal has a center frequency $f_{RX}$ and that amplitudes not equal to 0 extend symmetrically to the left and right, i.e., towards smaller frequencies and towards larger frequencies, namely having the signal bandwidth B. The signal bandwidth is the center frequency $f_{RX}$ of the signal. The frequency spectrum therefore extends B/2 to the left of the center frequency $f_{RX}$ and B/2 to the right of the center frequency $f_{RX}$. The other signals discussed here are also to be understood in the same way.

In a further development of the method, it is provided that the conversion of the receive signal $S_{RX}$ into the first work signal $S_1$ is carried out by mixing the receive signal $S_{RX}$ with a local oscillator signal $S_{LO}$ of the conversion frequency $f_U$. During mixing, the receive signal $S_{RX}$ is converted in its center frequency position, i.e., in dependence on the conversion frequency $f_U$ of the local oscillator signal $S_{LO}$. Preferably for example with a multiplicative mixing only a mixed-down signal is received, in that a suitable low-pass or bandpass filter is used.

Another advantage is that the conversion of the third work signal $S_3$ into the reflection signal $S_{TX}$ is achieved by mixing the third work signal $S_3$ with a local oscillator signal $S_{LO}$ of the conversion frequency $f_U$. This is advantageous in connection with the simultaneous mixing-up of the receive signal $S_{RX}$ into the first work signal $S_1$. In this case, it is provided that both the mixing-down and the mixing-up with the local oscillator signal $S_{LO}$ of the conversion frequency $f_U$ uses an identical local oscillator signal $S_{LO}$, which is generated by a single local oscillator. This solution is very easy and cost-effective to implement.

A further advantageous implementation of the method is characterized in that the first work signal $S_1$ is converted into the second work signal $S_2$ by time-discrete sampling of the work signal $S_1$ at a sampling frequency $f_{sample}$ and subsequent digital-to-analog conversion of the sampled work signal $S_1$ into an analog work signal $S_2$. This method step takes advantage of the fact that periodically repeating frequency bands are formed in the frequency spectrum of the sampled signal when a signal is sampled in a time-discrete manner, and that time-discrete sampling is therefore suitable for frequency shifting a signal. If the first work signal $S_1$ exhibits the first work frequency $f_1$ and the frequency spectrum of the signal also has a signal bandwidth B, then this band repeats in the sampled signal in the intervals $f_1 +/- n*f_{sample}$ with n={ . . . ; −3; −2; −1; 0; 1; 2; 3; . . . }. It should be taken into account that the negative frequency band of the sampled signal must also be continued periodically, i.e., also starting from the negative first work frequency $-f_1$. Preferably, then, the second work signal $S_2$ is only further considered when having a work frequency $f_2$ lower than the first work frequency $f_1$ of the first work signal $S_1$.

Since the first work frequency $f_1$ of the first work signal $S_1$ is already smaller—possibly much smaller—than the receive frequency $f_{RX}$ of the receive signal, correspondingly slower analog-to-digital converters or digital-to-analog converters can be used for the analog-to-digital conversions or for the corresponding digital-to-analog conversions of the sampled work signal $S_1$, overall the data rates to be managed are thus considerably reduced.

According to an advantageous design, the sampling frequency $f_{sample}$ should be greater than the signal bandwidth B of the receive signal $S_{RX}$. This measure ensures that the periodically repeating bands of the sampled first work signal do not overlap in the frequency spectrum, which is a pre-requisite for a flawless reconstruction of the sampled signal. According to a further advantageous design, it is provided that the first work signal $S_1$ is sub-sampled, $f_{sample}$ is thus smaller than twice the greatest frequency in the spectrum of the first work signal $S_1$. With this design, aliasing or folding can result in components in the frequency spectrum of the sampled signal that are smaller in frequency than the frequencies of the sampled signal. However, this mostly undesirable effect can be used specifically and is often referred to as digital down conversion (DDC). With the knowledge that the low-frequency aliasing band or folding band is only a low-frequency image of the higher-frequency signal, the sampled signal can be perfectly reconstructed from a lower-frequency aliasing band or a lower-frequency folding band.

It is provided in one implementation that the second work signal $S_2$ and the third work signal $S_3$ are converted by means of mixing with a first auxiliary signal $S_{H1}$ having a frequency $f_{H1}$. Advantageously, the frequency $f_{H1}$ of the first auxiliary signal $S_{H1}$ then corresponds to the sum frequency of the frequency $f_1$ of the first work signal $S_1$, the frequency $f_2$ of the second work signal $S_2$ and the Doppler frequency $f_D$ or the negative Doppler frequency $-f_D$. Here, it already becomes apparent that if such a first auxiliary signal $S_{H1}$ is mixed-down with the second work signal $S_2$ having the second work frequency $f_2$, a third work signal $S_3$ results which—as desired—has the frequency $f_1 +/- f_D$. If this work signal $S_3$ is now mixed-up with the conversion frequency $f_U$, a reflection signal results having the desired reflection frequency $f_{TX}$, which corresponds to the frequency $f_{RX}$ of the receive signal $S_{RX}$, but is increased (radially approaching object) or decreased (radially moving-away object) by the Doppler frequency $f_D$.

The presented method can be implemented quite simply and inexpensively with mostly analog circuit technology, in particular when generating the third work signal $S_3$ from the second work signal $S_2$, in which the Doppler frequency $f_D$ to be simulated is introduced using signals.

The described object is achieved with the testing device for testing a distance sensor operating with electromagnetic waves described in the introduction by providing appropriate means that make it possible to carry out the method described above using the testing device, wherein the means are specifically designed in such a manner that the testing device carries out the method described above during operation. In particular, this means that the receive signal $S_{RX}$ is converted by a first converter into a first work signal $S_1$ having a first work frequency $f_1$, wherein the work frequency $f_1$ is smaller, by a conversion frequency $f_U$, than the receive frequency $f_{RX}$ of the receive signal $S_{RX}$, that the first work signal $S_1$ is converted by a second converter into a second work signal $S_2$ having a second work frequency $f_2$, wherein the absolute value of the difference between the first work frequency $f_1$ and the second work frequency $f_2$ is at least as large as the signal bandwidth B, preferably at least as large as the sum of the signal bandwidth B and the Doppler frequency $f_D$, that the second work signal $S_2$ is converted by a third converter into a third work signal $S_3$ having a third work frequency $f_3$, wherein the third work frequency $f_3$ corresponds to the first work frequency $f_1$ shifted by the Doppler frequency $f_D$, and that the third work frequency $f_3$ corresponds to the first work frequency $f_1$ shifted by the Doppler frequency $f_D$ and that the third work signal $S_3$ is increased by the conversion frequency $f_U$ using a fourth converter and is thus converted into the reflection signal $S_{RX}$ and radiated.

BRIEF DESCRIPTION OF THE DRAWINGS

In detail, there is now a plurality of possibilities for designing and further developing the method according to the invention for operating a testing device for testing a distance sensor operating with electromagnetic waves and a related testing device. For this, reference is made to the following description of embodiments in conjunction with the drawings.

DETAILED DESCRIPTION

Figure 1:
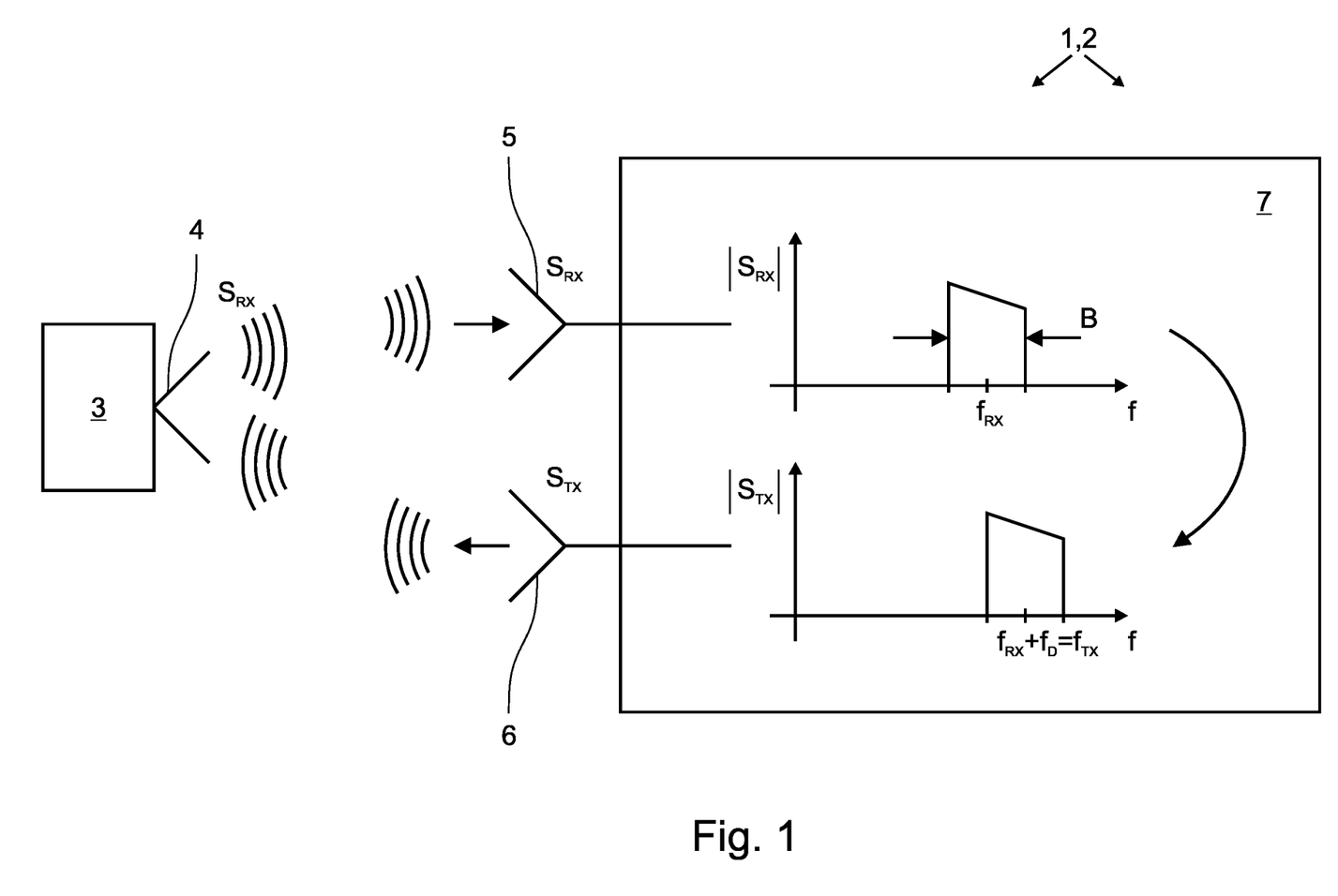
FIG. 1 illustrates a method known from the prior art for operating a testing device for testing a distance sensor operating with electromagnetic waves and such a testing device.

FIG. 1 shows a method 1 for operating a testing device 2 for testing a distance sensor 3 operating with electromagnetic waves and also a corresponding testing device 2. The method 1 and testing device 2 are used for testing the distance sensor 3, which, in this case, is a distance sensor 3 operating with radar waves. The distance sensor 3 has a transmitting and receiving device 4 for radiating radar signals and for receiving radar signals which have been reflected by an object in actual use. In the shown test situation, there is no actual object, but only the testing device 2 with the implemented method 1 for the simulation of an actual object in view of the distance sensor 3 to be tested. The method 1 and the testing device 2 are used for the generation and radiation of a simulated electromagnetic reflection signal $S_{TX}$ having a reflection frequency $f_{TX}$.

The electromagnetic wave radiated by the distance sensor 3 is received as an electromagnetic free-space wave as a receive signal $S_{RX}$ having a receive frequency $f_{RX}$. The receive signal $S_{RX}$ also has a signal bandwidth B. This is indicated in FIG. 1 by the uppermost frequency spectrum.

The reflection signal $S_{TX}$ is generated from the electromagnetic receive signal $S_{RX}$ in a manner not shown here in detail, wherein the reflection frequency $f_{TX}$ is shifted by a Doppler frequency $f_D$ with respect to the receive frequency $f_{RX}$, whereby the Doppler frequency $f_D$ is smaller than the signal bandwidth B of the receive signal $S_{RX}$. This is indicated in the lower part by the second frequency spectrum of FIG. 1.

In the present case, the receive signal $S_{RX}$ has a center frequency $f_{RX}$ of 77 GHz and a bandwidth B of 1 GHz. The testing device 2 has a receiving element 5 for receiving the receive signal $S_{RX}$. The testing device 2 has a radiating element 6 for radiating the simulated electromagnetic reflection signal $S_{TX}$. In the example shown in FIG. 1, the receiving element 5 and the radiating element 6 are separate antennas, which need not necessarily be the case, but the receiving element 5 and the radiating element 6 may also be designed as a single common antenna. The testing device 2 comprises signal electronics 7 which generate the reflection signal $S_{TX}$ from the receive signal $S_{RX}$. How this is carried out in the prior art is not described further here.

Figure 2:
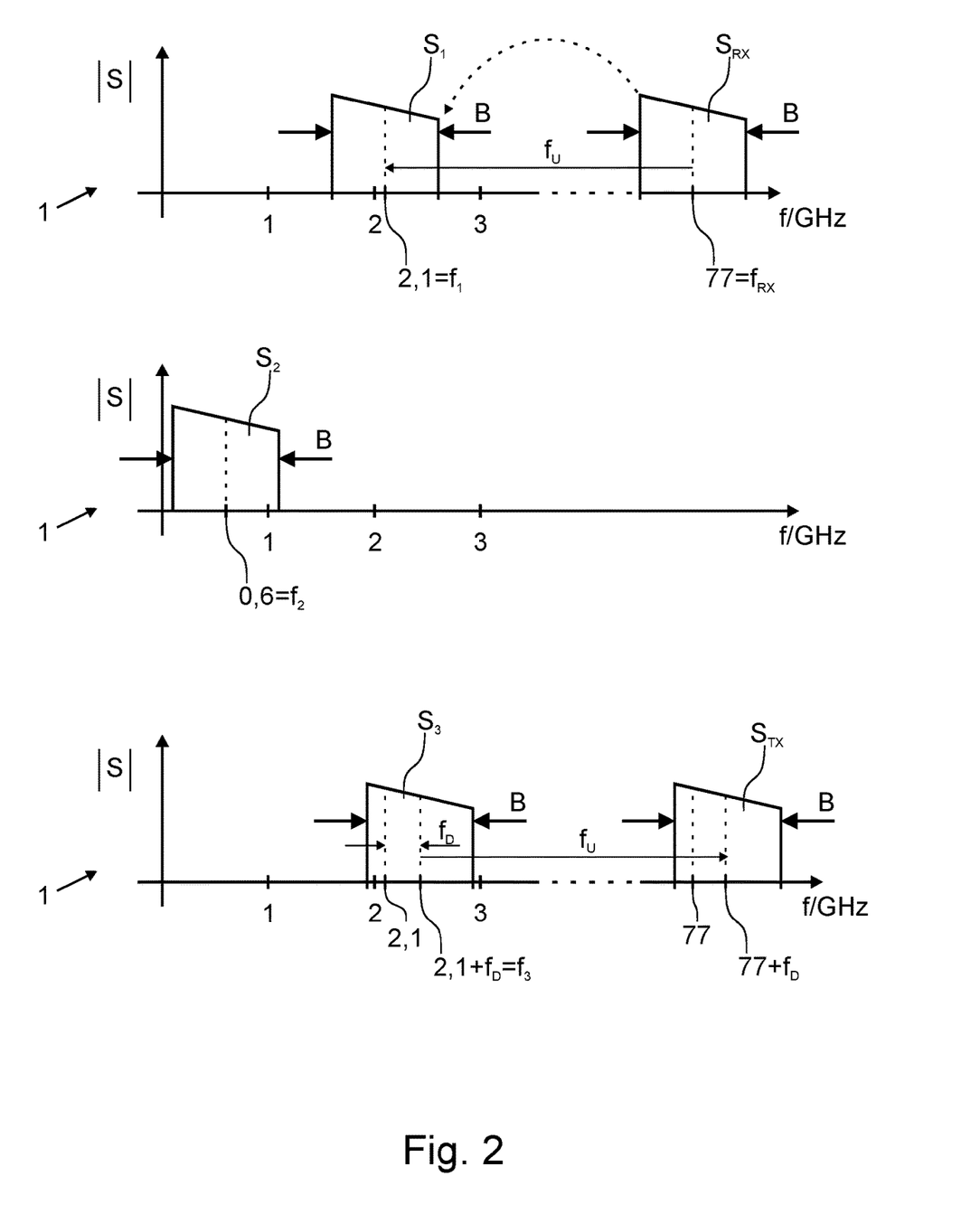
FIG. 2 illustrates a method according to the invention with frequency spectra of different signals.

FIG. 2 now shows the method 1, with which a reflection signal $S_{TX}$ shifted by the Doppler frequency $f_D$ is generated from the receive signal $S_{RX}$. The method is shown here using frequency spectra in which the various signals involved are represented in terms of frequency. In the uppermost frequency spectrum, it can be seen that the high-frequency receive signal $S_{RX}$ having a receive frequency $f_{RX}$ of 77 GHz is converted into a first work signal $S_1$ with a first work frequency $f_1$ of 2.1 GHz. The work frequency $f_1$ is smaller here, by a conversion frequency $f_U$, than the receive frequency $f_{RX}$ of the receive signal $S_{RX}$. This first frequency conversion is carried out in order to be able to work in a smaller frequency range that is easier to handle in terms of circuitry. It has been recognized that a direct conversion of the receive signal $S_{RX}$; into the reflection signal $S_{TX}$ is not possible, since the desired frequency offset around the Doppler frequency $f_D$ is extremely small compared to the bandwidth B of the receive signal $S_{RX}$. A direct mixing of the receive signal $S_{RX}$ with a signal having the Doppler frequency $f_D$ or a time-discrete sampling of the receive signal $S_{RX}$ with a sampling rate $f_{sample}$ that is much smaller than the bandwidth of the receive signal $S_{RX}$ would lead to overlapping spectra in the frequency spectrum, so that the reflection signal $S_{TX}$ would no longer be a single-frequency, shifted receive signal $S_{RX}$, but a completely different signal.

Figure 3:
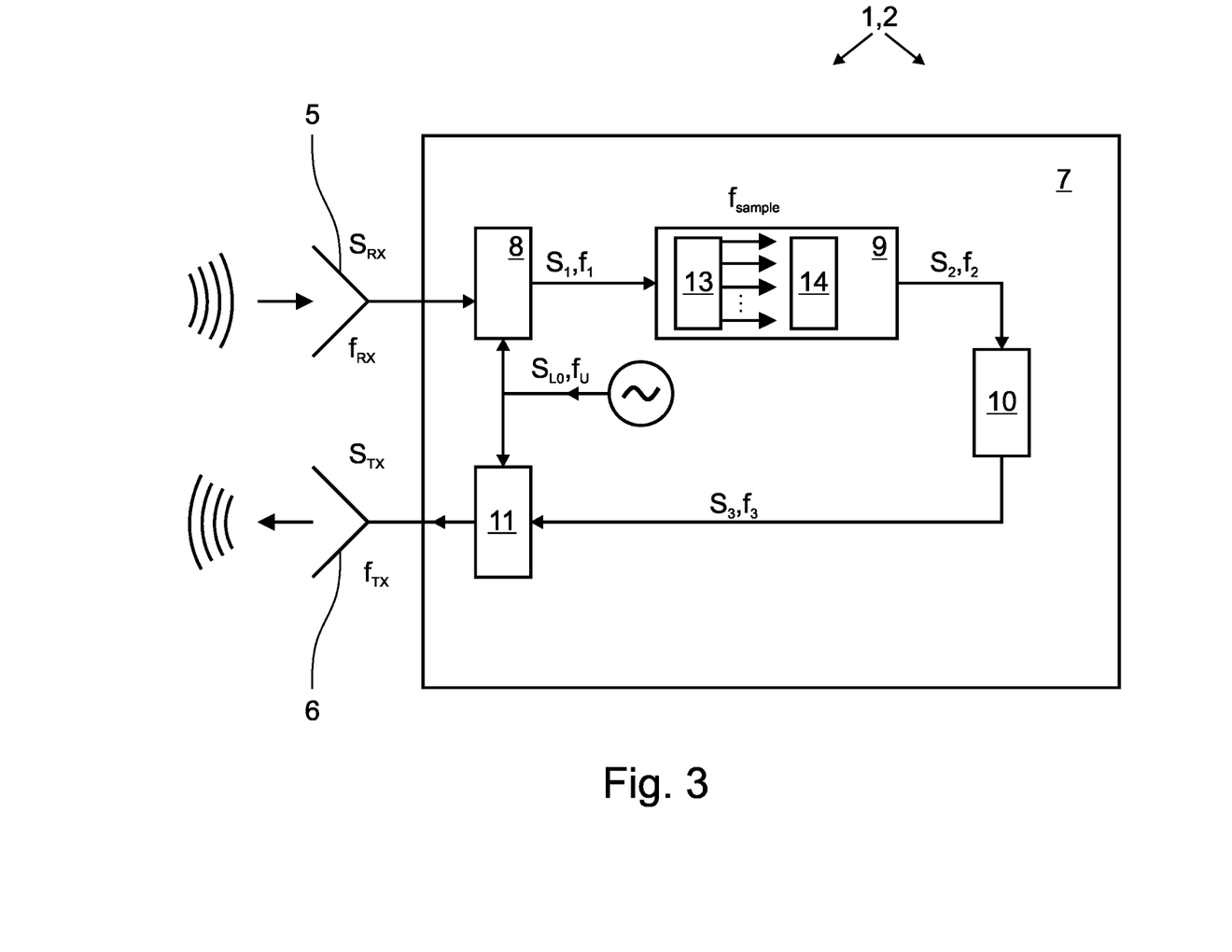
FIG. 3 illustrates a method and a device according to the invention with a schematic signal flow diagram.

It is useful to look at FIG. 3 in parallel to FIG. 2, which, in addition to the signal course of the method 1, also simultaneously, schematically depicts the testing device 2. In FIG. 3, the means by which the various method steps in FIG. 2 are carried out are also shown here. For example, FIG. 3 shows that the receive signal $S_{RX}$ is converted into the first work signal $S_1$ with a first converter 8.

It is now provided and shown in FIG. 2 in the medium frequency spectrum that the first work signal $S_1$ is converted into a second work signal $S_2$ having a second work frequency $f_2$, wherein the absolute value of the difference between the first work frequency $f_1$ and the second work frequency $f_2$ is at least as great as the signal bandwidth B. This ensures that no overlapping bands occur in the frequency spectrum. In the present case, the second work frequency $f_2$ of the second work signal is selected to be 0.6 GHz. The distance between the spectra is sufficiently large with the above-mentioned requirement of being able to manage without collisions of any frequency bands that might occur during the subsequent frequency shift of the second work signal $S_2$. The first work signal $S_1$ is converted into the second work signal $S_2$ by a second converter 9 (FIG. 3).

In a further step, it is now provided that the second work signal $S_2$ is converted into a third work signal $S_3$ having a third work frequency $f_3$, wherein the third work frequency $f_3$ corresponds to the first work frequency $f_1$ shifted by the Doppler frequency $f_D$. In the example shown, the Doppler frequency $f_D$ has been added to the first work frequency $f_1$, which corresponds to an approaching of an object to be simulated. Equally, the third work signal $S_3$ could also be shifted in the other direction toward the first work frequency $f_1$, i.e., towards lower frequencies, which corresponds to an object moving away. Since the third work frequency $f_3$ was selected in dependence on the first work frequency $f_1$, the third work signal $S_3$ can now be increased by the conversion frequency $f_U$, i.e., the conversion frequency $f_U$ that was used in the frequency spectrum shown at the top for conversion to a low frequency range, whereby the reflection signal $S_{TX}$ is generated and finally radiated. The second work signal $S_2$ is converted into the third work signal $S_3$ with a third converter 10. Accordingly, the third work signal $S_3$ is increased by the conversion frequency $f_U$ with a fourth converter 11, whereby the reflection signal $S_{TX}$ is generated and radiated.

In the embodiment shown in FIG. 3, the receive signal $S_{RX}$ is converted into the first work signal $S_1$ by mixing the receive signal $S_{RX}$ with a local oscillator signal $S_{LO}$ having the conversion frequency $f_U$. The first converter 8 is therefore designed as a mixer. The local oscillator signal $S_{LO}$ is generated by a first local oscillator 12.

When the various signals are converted, the signal bandwidth B is retained in each case. In the embodiment shown (upper frequency spectrum in FIG. 2), the spectrum of the first work signal $S_1$ is shifted such that it is spaced from the frequency 0 by more than one signal bandwidth B, because the smallest frequency of the spectrum of the first work signal $S_1$ is 1.6 GHz. This plays a role in connection with the present embodiment (middle frequency spectrum in FIG. 2), since the second work frequency $f_2$ of the second work signal $S_2$ is smaller than the first work frequency $f_1$ of the first work signal $S_1$.

The clever selection of the work frequency $f_3$ of the third work signal enables that the conversion of the third work signal $S_3$ into the reflection signal $S_{TX}$ is achieved by mixing the third work signal $S_3$ with the same local oscillator signal $S_{LO}$ of the conversion frequency $f_U$. Consequently, the fourth converter 11 is designed as a mixer and is supplied with the local oscillator signal $S_{LO}$ generated by the first local oscillator 12. This makes the circuit design simple, since one and the same mix signal $S_{LO}$ can be used for input-side mixing-down of the receive signal and output-side mixing-up of the third work signal $S_3$ to generate the reflection signal $S_{RX}$.

As already mentioned, the second work frequency $f_2$ of the second work signal $S_2$ generated by the second converter 9 is smaller than the first work frequency $f_1$ of the first work signal $S_1$; this is possible without problems because sufficient distance to the zero frequency was left during the generation of the first work signal $S_1$.

As indicated in FIG. 3, the first work signal $S_1$ and the second work signal $S_2$ are converted by time-discrete sampling of the work signal $S_1$ having a sampling frequency $f_{sample}$. Subsequent digital-to-analog conversion of the sampled work signal $S_1$ produces an analog work signal $S_2$. This is achieved by converting the first work signal $S_1$ into the second work signal $S_2$ with an analog-to-digital converter 13, which is part of the second converter 9, by time-discrete sampling of the work signal $S_1$ having a sampling frequency $f_{sample}$. Accordingly, the second converter 9 also comprises a digital-to-analog converter 14, which generates an analog work signal $S_2$ from the sampled work signal $S_1$. As explained in the general description section, the fact is taken advantage of here that when a signal in the frequency spectrum of the sampled signal is sampled in a time discrete manner, a periodically repeating sequence of the sampled signal occurs, both towards higher frequencies and towards lower frequencies. Since the work signal $S_1$ has been shifted into a very small frequency range, the analog-to-digital converter 13 and the digital-to-analog converter 14 can operate with relatively low data rates. This also has a positive effect on the comparatively simple design of the testing device 2 and signal electronics 7 of the testing device 2. In another embodiment, the second converter 9 is designed as a digital signal processor (DSP), with which a corresponding analog-to-digital conversion or digital-to-analog conversion is implemented. In the embodiment shown, the sampling frequency $f_{sample}$ is greater than the signal bandwidth B of the receive signal $S_{RX}$, which prevents the frequency bands in the frequency spectrum (not shown here in detail) from overlapping periodically, so that the sampled signal can be reconstructed perfectly. In the embodiment shown, the first work signal $S_1$ is sub-sampled by the second converter 9. The sampling frequency $f_{sample}$ is implemented with 2.7 GHz and therefore smaller than twice the greatest frequency in the spectrum of the first work signal $S_1$, the largest frequency here being 2.6 GHz. This subsampling results in frequency bands in a lower frequency range. Knowing that these frequency bands actually correspond to a higher frequency in the sampled signal, a perfect reconstruction of the sampled signal is also possible using the lower frequency band (digital down conversion).

In the embodiment shown, it is implemented that the sampling frequency $f_{sample}$ of the analog-to-digital converter 13 contained in the second converter 9 is greater than the greatest frequency in the spectrum of the first work signal $S_1$, i.e., greater than 2.6 GHz. At the selected sampling frequency there is so-called folding, which leads to a reflection of the sampled frequency band (inverse position, see middle frequency spectrum in FIG. 2).

Figure 4:
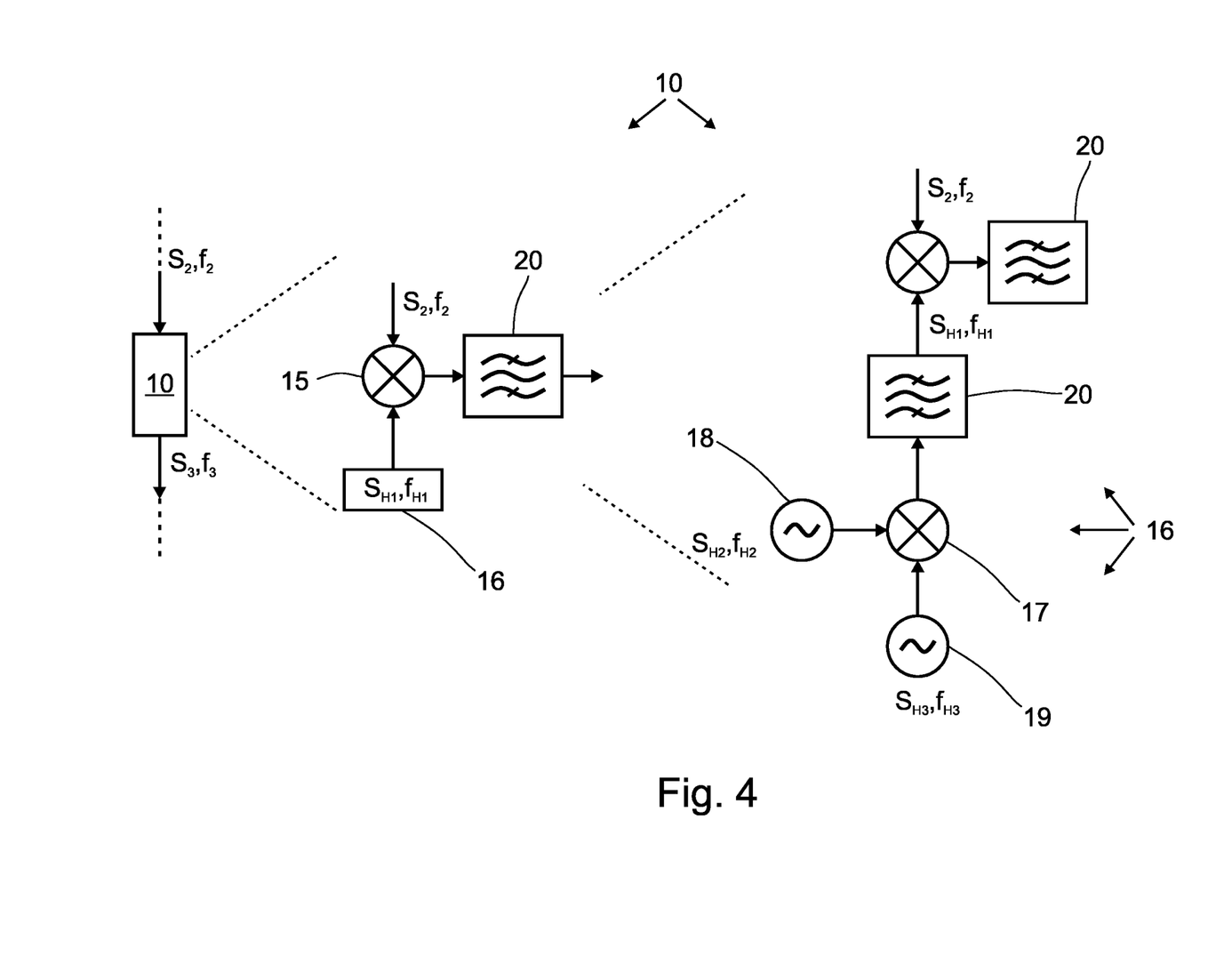
FIG. 4 illustrates a more detailed representation of the third converter in analog technology.

The Doppler frequency $f_D$ is introduced in the third converter 10. The configuration of the third converter 10 as well as the method implemented in it are shown in detail in a signal flow diagram in FIG. 4. In FIG. 4, the degree of detail of the illustration increases from left to right. The middle figure shows that the second work signal $S_2$ is converted into the third work signal $S_3$ by mixing with a first auxiliary signal $S_{H1}$ having a frequency $f_{H1}$. The third converter 10 is therefore essentially designed as a mixer or comprises such a mixer 15 as a central element. The first auxiliary signal $S_{H1}$ is generated by an auxiliary signal generator 16.

The frequency $f_{H1}$ of the first auxiliary signal $S_{H1}$ generated by the auxiliary signal generator 16 corresponds to the sum frequency of the frequency $f_1$ of the first work signal $S_1$, the frequency $f_2$ of the second work signal $S_2$ and the Doppler frequency $f_D$ or the negative Doppler frequency $-f_D$. Thus, a frequency shift of the receive signal $S_{RX}$ to a frequency increased by the Doppler frequency $f_D$ as well as to a frequency reduced by the Doppler frequency $f_D$ can be implemented. FIG. 4 also shows that the first auxiliary signal $S_{H1}$, is generated by the auxiliary signal generator 16 by mixing a second auxiliary signal $S_{H2}$ having the frequency $f_{H2}$ and a third auxiliary signal $S_{H3}$ having the frequency $f_{H3}$ with an auxiliary signal mixer 17. The frequency $f_{H2}$ corresponds to the sum frequency of the frequency $f_1$ of the first work signal $S_{H1}$ and the Doppler frequency $f_D$. The frequency $f_{H3}$ of the third auxiliary signal $S_{H3}$ corresponds to the Doppler frequency $f_D$. The auxiliary signal generator 16 comprises a local oscillator 18 with a fixed frequency and a tunable oscillator 19 with a tunable frequency. The second auxiliary signal $S_{H2}$ is therefore generated by the local oscillator 18 having a fixed frequency and the third auxiliary signal $S_{H3}$ is generated by the tunable oscillator 19 having a tunable frequency. This tunable frequency is the Doppler frequency $f_D$ by which the receive signal $S_{RX}$ is to be shifted. The Doppler frequency $f_D$ is usually given by an environment simulation and changes constantly with the constantly changing driving situation simulated by an environment simulator.

As can be seen in particular from the illustration in FIG. 4, the signals generated are—at least partially—filtered out of an entire spectrum by means of a suitable bandpass filter 20 or by means of a suitable low-pass filter.

Here, it is implemented that after mixing the second auxiliary signal $S_{H2}$ with the third auxiliary signal $S_{H3}$ by means of the auxiliary signal mixer 17, a very narrow-band bandpass filter 20 is used to filter out one of the two resulting mixed signals; the present mixed signal has the frequency $f_1+f_2+f_D$, as can be seen from the bottom illustration in FIG. 3.

The invention claimed is:

1. A method for operating a testing device for testing a distance sensor operating with electromagnetic waves comprising:
   receiving an electromagnetic free-space wave as a receive signal having a receive frequency and a signal bandwidth;
   generating a simulated electromagnetic reflection signal from the received electromagnetic signal;
   shifting a reflection frequency of the reflection signal by a Doppler frequency relative to the receive frequency, wherein the Doppler frequency is smaller than the signal bandwidth of the receive signal;
   converting the receive signal into a first work signal having a first work frequency, wherein the work frequency is smaller, by a conversion frequency, than the receive frequency of the receive signal;
   converting the first work signal into a second work signal having a second work frequency, wherein the absolute value of the difference between the first work frequency and the second work frequency is at least as large as the signal bandwidth;
   converting the second work signal into a third work signal having a third work frequency, wherein the third work frequency corresponds to the first work frequency shifted by the Doppler frequency;
   increasing the third work signal by the conversion frequency and, thus, converting the third work signal into the reflection signal; and
   radiating the third work signal.

2. The method according to claim 1, wherein the conversion of the receive signal into the first work signal is carried out by mixing the receive signal with a local oscillator signal of the conversion frequency.

3. The method according to claim 1, wherein a spectrum of the first work signal having a signal bandwidth is spaced from the frequency zero at least by the signal bandwidth.

4. The method according to claim 1, wherein the conversion of the third work signal into the reflection signal is achieved by mixing the third work signal with a local oscillator signal of the conversion frequency.

5. The method according to claim 4, wherein the local oscillator signal of the conversion frequency for mixing the receive signal and for mixing the third work signal is an identical local oscillator signal generated by a single local oscillator.

6. The method according to claim 1, wherein the second work frequency of the second work signal is smaller than the first work frequency of the first work signal.

7. The method according to any claim 1, wherein the first work signal is converted into the second work signal by time-discrete sampling of the work signal at a sampling frequency and subsequent digital-to-analog conversion of the sampled work signal into an analog work signal.

8. The method according to claim 7, wherein the sampling frequency is greater than the signal bandwidth of the receive signal and the first work signal is sub-sampled, thus, the sampling frequency is smaller than twice the greatest frequency in the spectrum of the first work signal.

9. The method according to claim 8, wherein the sampling frequency is greater than the greatest frequency in the spectrum of the first work signal.

10. The method according to claim 1, wherein the second work signal is converted into the third work signal by mixing with a first auxiliary signal having a frequency.

11. The method according to claim 10, the a first frequency of the first auxiliary signal corresponds to the sum frequency of the frequency of the first work signal, the frequency of the second work signal and the Doppler frequency.

12. The method according to claim 10, wherein the first auxiliary signal is generated by mixing a second auxiliary signal having a second frequency and a third auxiliary signal having a third frequency; and
wherein the second frequency corresponds to the sum frequency of the frequency of the first work signal and the frequency of the second work signal; and
wherein the third frequency corresponds to the Doppler frequency.

13. The method according to claim 12, wherein the second auxiliary signal is generated by a local oscillator having a fixed frequency and the third auxiliary signal having tunable frequency is generated by a tunable oscillator.

14. The method according to claim 1, wherein at least one of the generated signals is filtered out of a total spectrum by means of a suitable bandpass filter or by means of a suitable low-pass filter after a mixing operation.

15. The method according to claims 14, wherein, after mixing the second auxiliary signal with the third auxiliary signal, a very narrow-band band filter is used in order to filter out one of the two resulting mixed signals.

16. A testing device for testing a distance sensor operating with electromagnetic waves comprising:
a receiving element for receiving an electromagnetic free-space wave as a receive signal having a receive frequency and a signal bandwidth;
a radiating element for radiating a simulated electromagnetic reflection signal having a reflection frequency;
signal electronics configured to generate the reflection signal from the electromagnetic receive signal the reflection signal having a reflection frequency shifted by a Doppler frequency to be simulated with respect to the receive frequency of the receive signal, wherein the Doppler frequency is smaller than the signal bandwidth of the receive signal;
a first converter configured to convert the receive signal into a first work signal having a first work frequency, wherein the work frequency is smaller, by a conversion frequency, than the receive frequency of the receive signal;
a second converter configured to convert the first work signal into a second work signal having a second work frequency, wherein the absolute value of the difference between the first work frequency and the second work frequency is at least as large as the signal bandwidth;
a third converter configured to convert the second work signal into a third work signal having a third work frequency, wherein the third work frequency corresponds to the first work frequency shifted by the Doppler frequency, wherein the third work frequency corresponds to the first work frequency shifted by the Doppler frequency; and
a fourth converter configured to increase the third work signal by the conversion frequency and thus convert the third work signal into the reflection signal and radiate the third work signal.

17. The testing device according to claim 16, wherein the conversion of the receive signal into the first work signal is carried out by means of a first converter designed as a mixer by mixing the receive signal with a local oscillator signal of the conversion frequency generated by a first local oscillator.

18. The testing device according to claim 16, wherein a spectrum of the first work signal generated by the first converter having a signal bandwidth is spaced from the frequency zero at least by the signal bandwidth.

19. The testing device according to claim 16, wherein the conversion of the third work signal into the reflection signal is achieved by the fourth converter, which is designed as a mixer, by mixing the third work signal with the local oscillator signal of the conversion frequency generated by the first local oscillator.

20. The testing device according to claim 16, wherein the second work frequency of the second work signal generated by the second converter is smaller than the first work frequency of the first work signal.

21. The testing device according to claim 16, wherein the first work signal is converted into the second work signal with an analog-to-digital converter contained in the second converter by time-discrete sampling of the work signal having a sampling frequency and subsequent digital-to-analog conversion of the sampled work signal into an analog work signal with a digital-to-analog converter contained in the second converter.

22. The testing device according to claim 21, wherein the sampling frequency of the analog-to-digital converter contained in the second converter is greater than the signal bandwidth of the receive signal, and the first work signal is sub-sampled, thus, is smaller than twice the greatest frequency in the spectrum of the first work signal.

23. The testing device according to claim 22, wherein the sampling frequency of the analog-to-digital converter contained in the second converter is greater than the greatest frequency in the spectrum of the first work signal.

24. The testing device according to claim 16, wherein the second work signal is converted into the third work signal by the third converter in the form of a mixer by mixing with a first auxiliary signaler having a first frequency generated by an auxiliary signal generator.

25. The testing device according to claim 24, wherein the first frequency of the first auxiliary signal generated by the auxiliary signal generator corresponds to the sum frequency of the frequency of the first work signal, the frequency of the second work signal and the Doppler frequency.

26. The testing device according to claim 24, wherein the first auxiliary signal is generated by the auxiliary signal generator by mixing a second auxiliary signal having the a second frequency and a third auxiliary signal having the a third frequency with an auxiliary signal mixer, wherein the frequency corresponds to the sum frequency of the first frequency of the first work signal and the second frequency of the second work signal and wherein the third frequency corresponds to the Doppler frequency.

27. The testing device according to claim 26, wherein the auxiliary signal generator includes a local oscillator with a fixed frequency and a tunable oscillator with a tunable frequency, and the second auxiliary signal is generated by the local oscillator having a fixed frequency and the third auxiliary signal having a tunable frequency is generated by the tunable oscillator.

28. The testing device according to claim 16, wherein at least one of the generated signals is filtered out of a total spectrum by means of a suitable bandpass filter or by means of a suitable low-pass filter carried out after a mixing operation.

29. The testing device according to claim 28, wherein, after mixing the second auxiliary signal with the third auxiliary signal by means of the auxiliary signal mixer, a very narrow-band bandpass filter is used to filter out one of the two resulting mixed signals.

* * * * *